Patented June 16, 1953

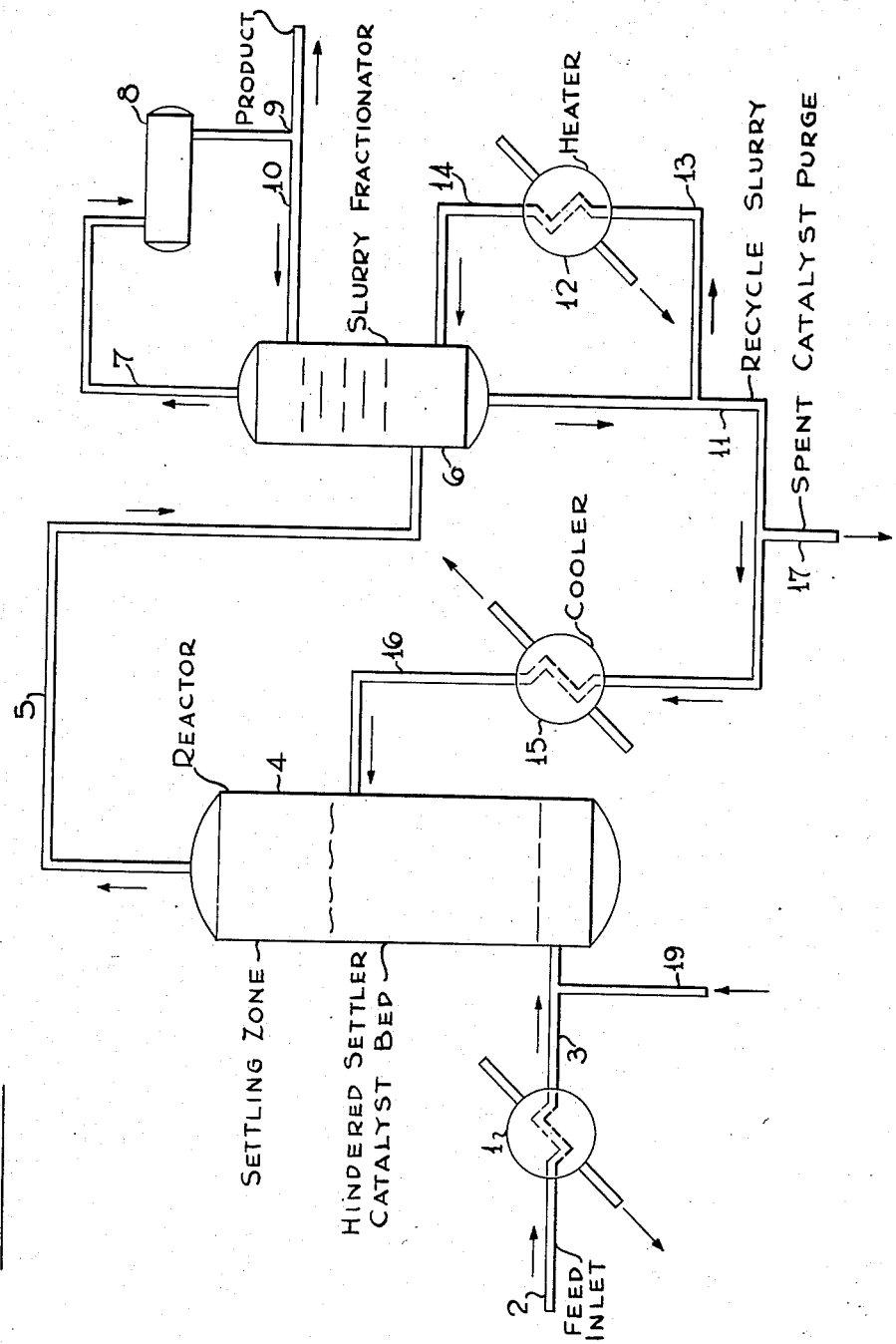

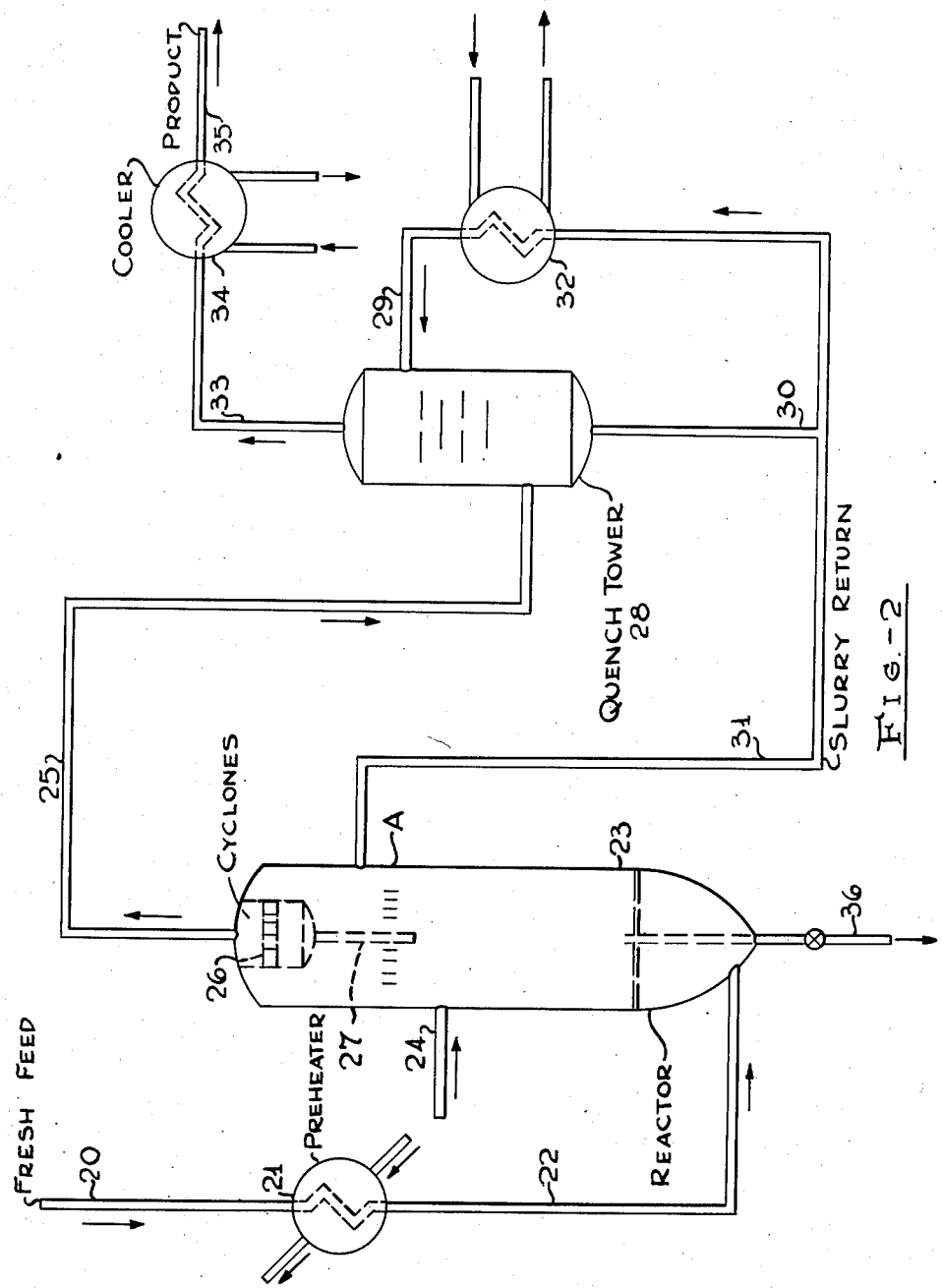

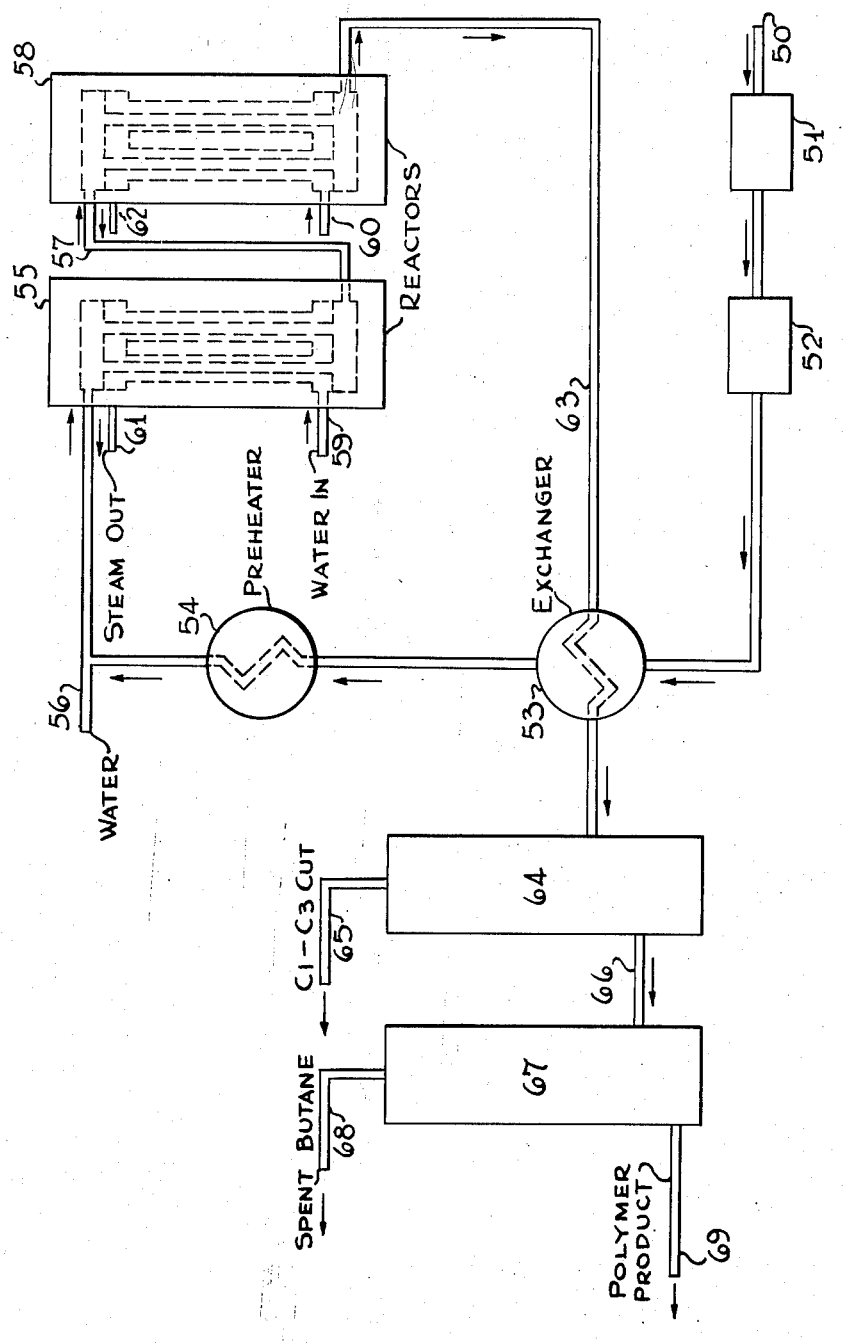

2,642,402

UNITED STATES PATENT OFFICE 2,642,402

OLEFIN POLYMERIZATION CATALYST AND ITS PREPARATION

Eugene S. Corner, Maplewood, and Charles S. Lynch, Plainfield, N. J., assignors to Standard Oil Development Company, a corporation of Delaware Application May 20, 1950, Serial No. 163,288

9 Claims. (Cl. 252—435)

The present invention is concerned with the polymerization of olefins and is more particularly concerned with an improved polymerization catalyst having a high activity and a strong structural formation. In accordance with the present invention, an improved olefin polymerization catalyst is secured by utilizing a silica gel as the carrier for phosphoric acid and precalcining the silica gel carrier within a critical temperature range prior to impregnation with the phosphoric acid.

It is well known in the art to treat olefins and olefin-containing streams with various catalysts, as for example, phosphoric acid in order to polymerize the olefins to higher boiling hydrocarbon constituents. In general, the feed streams comprise normally gaseous olefins, such as ethylene, propylene, butylenes, pentylenes and mixtures thereof, which are polymerized to hydrocarbon constituents which boil in the range below about 420° F. Although 100% olefinic streams may be utilized as feed stocks, it is generally preferred to have paraffinic diluents present in the range of from about 40% to 90% by weight in order to reduce the formation of carbonaceous deposits on the catalyst and to provide better temperature control in the catalyst bed. These phosphoric acid catalysts are usually deposited on solid carriers, as for example, diatomaceous earth, kieselguhr, silica gel, and the like. In general, these catalysts are satisfactory for securing the polymerization of the olefins in the feed stream. However, there exist certain inherent disadvantages with respect to their use in that the activities of the catalysts are not as high as it is desired. A particularly undesirable characteristic of catalysts heretofore used is that their structural strength is relatively weak, resulting in premature failures and disintegration of the same.

It is well known that solid, phosphoric acid type olefin polymerization catalysts tend to soften and disintegrate in conventional chamber and tubular olefin polymerization units. The loss of mechanical strength with resultant disintegration causes pressure build up in the unit and poor contacting due to feed channeling within the bed. Inasmuch as the mechanical failure of these catalysts frequently necessitates catalyst replacement, even though intrinsic activity is unaffected, it is highly important in order to take advantage of the excellent activity of phosphoric acid-silica base catalyst, that catalysts of good strength characteristics be prepared.

The improved catalysts of the present invention may be employed in conventional fixed bed tube units. However, since they are of a greater strength the catalysts of the present invention are particularly desirable for use in slurry type polymerization operations and in fluid catalyst polymerization processes.

The present invention may be more readily understood by reference to the attached drawings illustrating embodiments of the same. Figure 1 illustrates a slurry type polymerization operation, while Figure 2 illustrates a fluid catalyst polymerization process. Figure 3 illustrates a fixed bed tube process.

Referring specifically to Figure 1, a feed stream, which for the purpose of illustration is assumed to be a liquefiable normally gaseous hydrocarbon stream containing olefins, is passed through heating zone 1 by means of line 2. In this zone, the feed stream is heated to the desired temperature and withdrawn by means of line 3. The heated stream, which for the purpose of illustration is assumed to be at a temperature in the range from about 400° F. to 500° F., is introduced into the bottom of reaction chamber 4. Operations are so conducted as to provide a hindered settler catalyst bed in the lower area of reactor 4. In accordance with the present invention, the catalyst bed comprises phosphoric acid deposited on silica gel. The upper area of reactor 4 comprises a settling zone wherein the catalyst particles tend to settle from the liquid material flowing upwardly in zone 4. For the purpose of illustration, it is assumed that the pressure in reaction zone 4 is about 1000 lbs. per square inch.

The product stream is withdrawn from the top of reactor 4 by means of line 5 which stream contains catalyst fines. This stream is introduced into a slurry fractionation zone 6 which is maintained at a pressure preferably in the range from about 50 lbs. to 200 lbs. per square inch. A product stream completely free of catalyst fines is removed overhead from zone 6 by means of line 7 and passed into accumulation zone 8. A polymerized product comprising hydrocarbon constituents boiling in the motor fuel boiling range is withdrawn from zone 8 by means of line 9 and further refined or handled as desired. Under certain conditions, it may be desirable to recycle a portion of the product stream into zone 6 by means of line 10. The desired temperature in zone 6, which may vary from about 70° F. to 150° F. and higher, is maintained by any suitable means, as for example, by a reboiler arrangement. A recycle slurry stream is withdrawn from the bottom of zone 6 by means of line 11. A portion of this stream is passed through heater 12 by means of line 13 and recycled into zone 6 by means of line 14. The recycle stream removed from zone 6 is passed through a cooling zone 15 and reintroduced into zone 4 at an intermediate point by means of line 16. Periodically fresh catalyst is added to zone 4 by any suitable means while spent catalyst is withdrawn from the system by means of purge line 17. Water may be introduced into the system by means of line 19.

Referring specifically to Figure 2, a feed stream, which for the purpose of illustration is assumed to be liquefiable normally gaseous hydrocarbons, is introduced into the system by means of line 20 and passed through a preheater zone 21. These gases which for the purpose of illustration are assumed to be in the temperature range from about 250° F. to 300° F., are withdrawn from zone 21 by means of line 22 and introduced into the bottom of a reaction zone 23, wherein a catalyst is maintained in the fluidized state. For the purpose of illustration, it is assumed that reaction zone 23 is maintained at a pressure of about 300 lbs. per square inch and at a temperature of about 500° F. The catalyst comprises phosphoric acid on silica gel which may contain a relatively small amount of nickel phosphate or other added promoter. The catalyst particles have diameters in the range from about 20 to about 180 to 300 microns, and preferably have diameters in the range from about 20 to 120 microns. The linear velocity of the upflowing gas is in the range from about .5 to 10 ft. per second, whereby the catalyst particles are maintained in a fluidized state. The upper section of the fluidized catalyst bed is maintained at point A in the reaction zone. During the operation, water may be added continually or periodically to a point in the catalyst bed by means of line 24. The reaction product is removed from the top of zone 23 by means of line 25 after passing through cyclones or equivalent means 26. These cyclones serve to remove catalyst particles in the gas which are returned to the catalyst bed by means of line 27. The reaction gases are introduced into the bottom of a quench tower 28. These gases flow upwardly and countercurrently contact a downflowing quench liquid which is introduced into the top of zone 28 by means of line 29. The quench liquid serves to cool the reaction gases thus preventing any further reaction and to remove the last traces of catalyst particles from the gases. The slurry is removed from the bottom of zone 28 by means of line 30. A portion of the slurry is returned to zone 23 by means of line 31 at a point above the catalyst bed. The remainder of the slurry is passed through cooler 32 and recycled to the top of quench tower 28.

The product gases comprising hydrocarbons boiling in the motor fuel boiling range are removed overhead from zone 28 by means of line 33, passed through cooler 34 and removed from the system by means of line 35. These gases are condensed and further refined and handled as desired. Spent catalyst is removed from the system by withdrawing the same from the bottom of zone 23 by means of line 36.

Referring specifically to Figure 3, illustrating a fixed bed operation, feed gases comprising $C_3$ and $C_4$ olefins are introduced into the system by means of line 50. Hydrogen sulphide is removed from the gases in zone 51 and mercaptans removed in zone 52 by any suitable means. The feed gases are passed through heat exchanger zone 53, preheated to the desired temperature in zone 54 and then introduced into reactor 55. Water may be added to the feed gases in order to help maintain catalyst activity by means of line 56. The feed gases flow downwardly in zone 55, are removed by means of line 57 and introduced into the top of reactor 58. Since the polymerization reaction is highly exothermic, and since reactor temperature control is very important in terms of catalyst life and polymer quality, the desired temperature is maintained in the reactors by means of water circulation which is introduced into reactors 55 and 58 by means of lines 59 and 60 respectively. Water or steam is withdrawn from the respective reactors by means of lines 61 and 62. The tubes of reactors 55 and 58 contain polymerization catalyst comprising phosphoric acid deposited on a silica gel carrier.

The reactor product is withdrawn from reactor 58 by means of line 63, passed through heat exchanger 53 and introduced into stabilizer 64. Hydrocarbons boiling in the range of propane and lower are removed overhead from stabilizer 64 by means of line 65 while the higher boiling product is removed by means of line 66 and introduced into a debutanizer unit 67. Butane is removed overhead from zone 67 by means of line 68 while the polymer product is removed by means of line 69. This polymer product stream may be fractionated in order to secure the desired boiling range product or further refined and handled as desired.

The present invention is broadly concerned with an improved polymerization process utilizing phosphoric acid catalyst supported on silica gel which has been calcined prior to impregnation. The catalyst may also comprise from about .5 to 5% of a salt of copper, nickel, manganese, cobalt iron, cadminum and the like.

The calcination temperature used prior to impregnating with phosphoric acid should not be lower than about 400° F. nor higher than about 1400° F. A preferred temperature of calcining or drying the silica gel before impregnation is in the range from about 800 to 1250° F.

The silica gel may be prepared by any conventional procedure. One method is to add sulfuric acid to a solution of sodium silicate resulting in the formation of the sol which in turn sets to a gel. The gel will contain from about 80 to 90% of water and is preferably washed in order to free it of ionic contaminants prior to calcining.

After calcining the silica gel preferably at a temperature in the range from 800° F. to 1250° F., the calcined gel is pulverized and ball milled with phosphoric acid.

Any acid of phosphorous may be used, as for example, orthophosphoric acid, pyrophosphoric acid, diphosphoric acid, monoperphosphoric acid and diperphosphoric acid. In general, preferred acids comprise orthophosphoric acid and pyrophosphoric acid. The promoter salt if used may be any salt, as for example, the phosphate, the nitrate, the sulphate, the chloride, the fluoride, and the oxide.

The amount of phosphoric acid employed with respect to the silica gel may be varied appreciably. However, it is preferred that the concentration of the phosphoric acid be in the range from about 50 to 90% by weight of total catalyst, preferably in the range from 75 to 85% by weight calculated as $H_3PO_4$. The amount of promoter salt may vary appreciably if utilized as for example in the range from about 1 to 10%.

The wet slurry is preferably dried at a temperature in the range between about 375° F. to 425° F. A very desirable drying temperature is about 400° F. After drying the phosphoric acid impregnated silica gel is activated at a temperature in the range from about 600° F. to 1000° F.

The present invention may be more fully understood by the following example illustrating the same.

EXAMPLE

Various phosphoric acid silica gel catalysts were prepared by adding sodium silicate solution to sulfuric acid, washing with water to remove occluded sodium and sulphate ions and then dried at various temperatures and pulverized. The various drying temperatures used before impregnation were 250° F., 400° F., 1000° F., 1472° F., and 1800° F. At temperatures above 400° F. an initial drying step of 400° F. was employed prior to drying at temperatures of 1000 to 1800° F. The various dry silica gel portions were then ball milled with phosphoric acid, dried at a temperature in the range from about 375° F. to 425° F. and then calcined at 800° F. The various catalysts were then used on a feed stream containing 47% $C_3$ and $C_4$ olefins present in equal volumes in a polymerization operation employing a temperature of 450° F. and a thousand pounds per square inch pressure. The results of these operations are listed in Table I.

Table I.—*Effect of calcining $SiO_2$ gel base before adding $H_3PO_4$*

[80% $H_3PO_4$ 20% $SiO_2$; 47% $C_3=+C_4=$; 450°F.; 1000 p. s. i. g. 6.7 v. v./hr. 140° F. $H_2O$ saturator.]

| Cat. Age, Gal. Polymer Per # Cat. | No Heat | Olefin Conversion, $SiO_2$ Carrier | | | | |
|---|---|---|---|---|---|---|
| | | 250° F. | 400° F. | 1,000° F. | 1,472° F. | 1,800° F. |
| 10 | 96 | 94 | 93 | 92 | | (1) |
| 20 | Failure | 92 | 92 | 91 | 91 | |
| 30 | | 91 | 91 | 90 | 87 | |
| 40 | | 89 | 90 | 87 | 81 | |
| 50 | | 87 | 88 | 86 | | |

¹ The catalyst softened up when calcining at 1,800° F.

From the above it is apparent that no significant change in activity is secured by calcining the silica gel base at the various temperatures shown, except that the high temperature of 1472° F. is detrimental. However, additional operations were carried out and the strength of the respective catalysts measured after definite times on stream. The crushing strengths of the respective catalysts are listed in Table II.

*Table II*

[Propylene-butylene feed, 450° F.; reaction temp., 1,000 p. s. i. g., 3–6.7 v./v./hr.; Water saturator temp., 140° F.]

| Time on Stream, hours | 0 | $SiO_2$ Calcining Temperature | | | |
|---|---|---|---|---|---|
| | | 250° F. | 400° F. | 1,000° F. | 1,400° F. |
| | | Crushing Strength, Kg. | | | |
| 60 | | | | | |
| 100 | .3 | 1.3 | 2.2 | 2.5 | (1) |
| 200 | | 1.2 | 2.1 | 2.4 | |
| 300 | | 1.1 | 1.9 | 2.3 | |
| 400 | | 1.1 | 1.8 | 2.2 | |
| 500 | | 1.0 | 1.6 | 2.0 | |

¹ Catalyst strength inferior.

From the above it is apparent that a considerable increase in catalyst strength is secured by calcining at temperatures above 400° F., preferably at a temperature of about 1000° F.

The time of drying or calcining the silica gel before impregnation with phosphoric acid may vary appreciably, as for example from 4 to 48 hours and higher. However, it is preferred to employ a two-stage drying operation when employing the preferred calcining temperature of 800 to 1000°. Under these conditions the silica gel is first dried at a temperature of about 250 to 400° F. for a period from 10 to 60 hours and then calcined at a temperature in the range from 800 to 1000° for a period of from 2 to 10 hours.

The feed streams for the polymerization operation are preferably normally gaseous hydrocarbons containing olefins. Various diluents may be present. A preferred feed stream comprises one which contains from about 30 to 50% of olefins. Although the polymerization temperature may be in the range from about 300° F. to 900° F., a preferred polymerization temperature is in the range from about 400° F. to 500° F. Polymerization pressures likewise may vary widely, as for example, in the range from about 50 lbs. per square inch gauge to 1500 lbs. per square inch gauge. Preferred pressures are in the range from about 300 to 1000 lbs. per square inch gauge. Feed rates may vary depending upon other operating conditions. In general, the feed rates are in the range from about .5 to 15 volumes of liquefied gas per volume of catalyst per hour.

In order to maintain the activity of the catalyst at high levels for long operating periods, it may be necessary to inject continuously or at frequent intervals into the reactor containing the catalyst, small amounts of water in order to prevent dehydration of the catalyst. This water may be added in one of several ways. It may, if desired, be pumped directly into the inlet of the catalyst bed or metered streams may be employed. Another alternative is to contact the liquefied feed with water maintained at a suitable temperature to saturate the feed with the desired quantity of water. If the latter method is employed, the water for feed saturation is held at a temperature of from about 90 F. to 180° F. depending on operating conditions. An amount of water equivalent to from .1 to 2 gallons of water per thousand gallons of feed is required.

Having described the invention it is claimed:

1. Improved olefin polymerization catalyst composition consisting esentially of a phosphoric acid deposited on a silica gel base, said catalyst having been prepared by heat treating a silica gel base at a temperature in the range of 400°–1250° F. for at least 2 hours, forming a mixture of the heat treated silica gel and a phosphoric acid and pulverizing said mixture, drying the pulverized mixture at a temperature in the range of 375°–425° F., and calcining the dried mixture at a temperature in the range of 600°–1000° F. to form an active polymerization catalyst containing in the range of 50–90% by weight of phosphoric acid.

2. A catalyst composition as in claim 1 wherein said silica gel base is heat treated at a temperature in the range of 800°–1000° F., before mixing with said acid.

3. A catalyst composition as in claim 1 wherein said silica gel base is heat treated at a temperature in the range of about 250° to 400° F., for a period in the range of about 10–60 hours and then further heat treated at a temperature in the range of about 800°–1000° F. for a period in the range of 2–10 hours before mixing with said acid.

4. A catalyst composition as in claim 1 wherein the said silica gel base is heat treated for a time in the range of about 4-48 hours.

5. A process for making an improved olefin polymerization catalyst consisting essentially of phosphoric acid deposited on a silica gel base which includes the steps of forming a silica gel base, heat treating said silica gel base at a temperature in the range of 400°–1250° F. for at least 2 hours, forming a mixture of the heat treated silica gel and a phosphoric acid and pulverizing said mixture, drying the pulverized mixture at a temperature in the range of 375°–425° F., and calcining the dried mixture at a temperature in the range of 600° to 1000 F. to form an active polymerization catalyst containing in the range of 50–90% by weight of phosphoric acid.

6. A process as defined by claim 5 wherein said silica gel base is heat treated at a temperature in the range of 800°–1000° F. before mixing with said acid.

7. A process as defined by claim 5 wherein said silica gel base is heat treated at a temperature in the range of about 250°–400° F. for a period in the range of about 10–60 hours, and then further heat treated at a temperature in the range of 800°–1000° F. for a period in the range of 2–10 hours prior to mixing with said acid.

8. A process as defined by claim 5 wherein said silica gel base is heat treated for a time in the range of about 4-48 hours.

9. A process as defined in claim 5 wherein said dried mixture is calcined in a temperature in the range of about 700°–900° F.

EUGENE S. CORNER.
CHARLES S. LYNCH.

References Cited in the file of this patent

UNITED STATES PATENTS

| Number | Name | Date |
|---|---|---|
| 2,120,702 | Ipatieff et al. | June 14, 1938 |
| 2,121,258 | Osterstom et al. | June 21, 1938 |
| 2,129,733 | Fulton et al. | Sept. 13, 1938 |
| 2,447,599 | Schmerling | Aug. 24, 1948 |
| 2,496,621 | Deery | Feb. 7, 1950 |
| 2,547,380 | Fleck | Apr. 3, 1951 |